Oct. 4, 1966 W. G. BOWEN 3,276,898
PROCESS FOR TREATING NON-FIBROUS REGENERATED CELLULOSE
FILM WITH A POLYACETAL AND THE COATED FILM
Filed Feb. 23, 1962
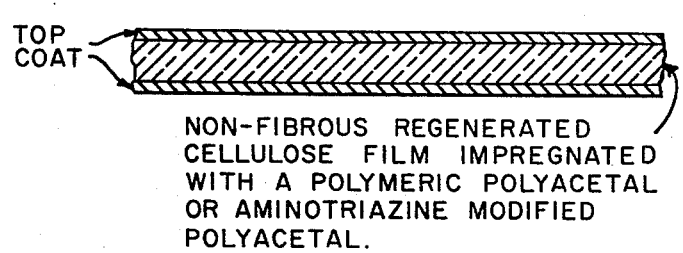
TOP COAT
NON-FIBROUS REGENERATED
CELLULOSE FILM IMPREGNATED
WITH A POLYMERIC POLYACETAL
OR AMINOTRIAZINE MODIFIED
POLYACETAL.
INVENTOR
WILBERT G. BOWEN
BY *Smart & Biggar*
ATTORNEYS.

3,276,898
PROCESS FOR TREATING NON-FIBROUS REGENERATED CELLULOSE FILM WITH A POLYACETAL AND THE COATED FILM
Wilbert George Bowen, Cornwall, Ontario, Canada, assignor to TCF of Canada Limited, Cornwall, Ontario, Canada
Filed Feb. 23, 1962, Ser. No. 175,327
Claims priority, application Canada, Feb. 24, 1961, 817,762
21 Claims. (Cl. 117—76)

This invention relates to a process for treating regenerated cellulose film in order to improve the anchorage of a subsequently applied top coat, and to regenerated cellulose film so treated with a bonded water-repellent coating thereon.

When coated unanchored regenerated cellulose film is subjected to immersion in water or aqueous solution, or to prolonged exposure to a moist atmosphere or surrounding conditions, the coating on the film tends to slough off. This property limits the use of coated unanchored films. To overcome this drawback, various anchorage agents have been proposed, the most commonly used being modified urea—or melamine-formaldehyde resins. However, these resins have certain disadvantages for this use, amongst which may be mentioned the facts that the bath stability of the resins is limited and that the film treated with such resins has a critical coating time. In regard to the latter, it is known that regenerated cellulose films treated with these anchorage resins must be coated normally within a matter of hours in order to prevent "blocking" of the roll of film.

The present invention is based on the discovery that certain acetal condensation products, or polyacetals, constitute excellent anchorage agents for non-fibrous regenerated cellulose film.

The invention is illustrated in the drawing which is a vertical section shown schematically, of film prepared as described herein.

Polyacetals of the polyalkylene glycol-aldehyde condensate type are known and have been proposed for use as textile treating agents, and for preparing paper of improved wet strength. However, wet strength resins in general have not proved to be satisfactory as anchorage agents for regenerated cellulose films, and, in particular, it could not be predicted that any particular product would be superior to, or even as good as, the known urea-formaldehyde or melamine-formaldehyde resins for this purpose. It has been discovered, however, that polyacetals have an excellent bath stability, and that the coating time for the anchored film is noncritical. An additional advantage of these polyacetals is that they add to the dimensional stability of the regenerated cellulose film.

The polyacetals which may be used as anchorage agents according to the present invention are polycondensates of glycols with aldehydes. Such condensates may also be modified by a reaction with aminotriazines for the purpose of this invention.

As glycols, there may be employed polyalkylene glycols having a straight chain alkylene group of from 2 to 4 carbon atoms, for example, diethylene glycol, dipropylene glycol, dibutylene glycols, triethylene glycol, tripropylene glycol, tetraethylene glycol, and polyethylene glycols having molecular weights of, for instance, 400, 1000 and 4000. These glycols may be employed either along, or in admixture with each other, or in admixture with up to 50 mol. percent of other polyols, such as glycerol, pentaerythritol and sorbitol. Diethylene glycol either alone or in admixture as described above is the preferred glycol.

The aldehyde component of the polyacetal may be formaldehyde or another reactive aldehyde containing not more than 8 carbon atoms per molecule in the monomeric form. Formaldehyde may be used in any of its various reactive polymeric or combined forms, such as paraformaldehyde, trioxane, aqueous formalin and methylal. As examples of other aldehydes which may be used there may be mentioned acetaldehyde, propionaldehyde, butyraldehyde, crotonaldehyde, 2-ethyl hexaldehyde, chloroacetaldehyde, hydroxyadipaldehyde, glyoxal, succinaldehyde, benzaldehyde, terephthaldehyde, and furfural. Acetals of the mono- and di-aldehydes can also be used as the aldehyde component as well as such precursors of aldehydes as dialkoxy, tetrahydrofurans and alkoxy dihydropyrans. Formaldehyde, in any of its forms, is the preferred aldehyde, and the polyacetals formed therefrom may be referred to as polyformals.

The polyacetals may be chain stopped by a lower alkyl radical containing not more than 8 carbon atoms, for instance, by the employment of a minor proportion of a lower alkyl half ether of glycol. By this means, the molecular weight of the polyacetal may be readily controlled.

These polyacetals may be prepared by reacting the glycol and aldehyde components with the aid of a strongly acidic catalyst, such as sulphuric acid, phosphoric acid, p-toluene sulphonic acid, zinc chloride, aluminum trichloride or an acid reacting clay. This list of catalysts is, of course, not exhaustive, and, in general, any alkylation, esterification, or Friedel-Crafts catalysts may be used. The polycondensation is carried out by heating the reactants and catalyst with or without the aid of an azeotroping solvent to remove the water of reaction. Toluene is a convenient solvent, and the polycondensation may be effected by refluxing the reactants and solvent using a trap to remove the water.

Where an aminotriazine-modified polyacetal is desired, the unmodified polyacetal may be first formed as described above, and then a minor amount of the aminotriazine added and the heating continued until a homogeneous mixture is formed. The amount of aminotriazine should be such that the molar ratio of glycol to aminotriazine lies in the range of 4.5:1 to 15:1, and preferably in the range 5:1 to 10:1. Suitable aminotriazines include melamine, acetoguanamine and benzoguanamine.

Any solvent used for the preparation of the polyacetal, as well as any unreacted aldehyde, is removed from the product, for instance, by vacuum evaporation, before using the polyacetal for the purpose of this invention. For ease of application, the water soluble polyacetals are greatly preferred.

Both the unmodified polyacetals and the aminotriazine modified polyacetals are available on the market. Quaker Chemical Products Corporation of Conshohocken, Pennsylvania, supply a number of such products, including thoses old under the designations "Reactant S C"; "X–1516"; "X–1540"; "X–1653"; "X–1694"; "XT–5206" and "XT–5390."

Several methods may be used for applying polyacetal anchorage resins to the regenerated cellulose film. In all cases, however, curing of the polyacetal-coated cellulose film is necessary. This may be achieved by the use of an acid catalyst and usually under the influence of heat. Suitable acid catalysts include potentially acidic catalysts, by which is meant a catalyst which is capable of developing acidity when exposed to the curing conditions. Examples of catalysts which may be used include acid salts such as zinc chloride, zinc nitrate, magnesium chloride, aluminum chloride, aluminum sulphate, ammonium chloride and boron trifluoride dihydrate; acids such as phosphoric, chloroacetic, dichloracetic, trichloracetic, oxalic, citric, lactic, tartaric, maleic and diglycolic; acid esters such as methyl acid sulphate and dimethyl acid pyrophosphate, and potentially acidic substances which liberate acids, for instance by hydrolysis, such as dimethyl oxalate and methyl p-toluene sulphate. In general, catalysts which are normally used in textile finishing operations for curing thermosetting resins and cross-linking cellulose reactants may be employed for the present purpose. The acidic catalyst is normally incorporated in an aqueous solution containing the polyacetal, and is generally used in a concentration of between 0.1 and 3.0 percent, depending on the type of catalyst.

The polyacetal may be applied to the regenerated cellulose film by any convenient method, such as by dipping, spraying or roller coating. The cellulose film, if not already in the swollen state, must be swollen by treatment with water before the anchorage agent is applied. The polyacetal concentration in the coating solution may be varied from between 0.1% to about 6%, but preferably lies within the range 0.5% to 2.0%. The exact method of application will have some bearing on the concentration chosen.

One of the preferred methods of application is to pass the swollen regenerated cellulose film into the aqueous resin solution or dispersion into which a cellulose softening or plasticizing agent has been incorporated. The immersion time is usually 5 to 60 seconds. The film is then dried, for instance by passage through a drying chamber or over heated rolls, to remove the excess moisture and to effect a partial cure. Another method which may be used is to treat the swollen regenerated cellulose film in an aqueous solution or dispersion of the anchorage resin and then passing the film into a bath containing the plasticizing agent and subsequently drying the film. Another modification involves treatment of the swollen cellulose film in an aqueous dispersion of the anchorage resin followed by a washing procedure to remove excess resin, then treatment in a plasticizing solution followed by the drying operation. Still another method which may be used is spraying the swollen regenerated cellulose film with an aqueous dispersion or solution of the resin, partially drying the film, subjecting the film to treatment with a plasticizing solution followed by a complete drying operation.

The presently preferred method of applying the anchorage agent is to pass the swollen cellulose film into a bath containing anchorage and plasticizing agents followed by the drying and curing operation. The plasticizing or softening agents which one may use in the practice of this invention are conventional cellulose softening agents and include, for instance, compounds such as the water soluble polyhydric alcohols and the water soluble ureas such as urea and thiourea. The use of the term polyhydric alcohol is not limited to those alcohols having more than 2 hydroxy groups, but includes the dihydric alcohols as well. As polyhydric alcohols one may successfully use such compounds as ethylene glycol, diethylene glycol, glycerol, trimethyl glycerol, tetraethylene glycol, propylene glycol and sorbitol.

It is preferred that the plasticizing bath be an aqueous solution of a soluble polyhydric alcohol of relatively low concentration, that is, about 8%. Increasing the concentration of the polyhydric alcohol has no appreciable effect on anchorage results.

It is essential that the polyacetal be cured on the regenerated cellulose film before the water-repellant coating is applied. The term "cured" is of course not an absolute one, and is used herein in the sense of achieving a practical result. In other words, the cure may be such as to achieve one or more of the following desired results, namely, freedom from blocking of the uncoated film, anchorage of the coating, and dimensional stability of the cellulose substrate. This may be accomplished at the same time as the drying operation or as a separate step, or partially in the drying operation and completer thereafter. The exact temperatures and times can readily be determined by those skilled in the art, but as a guide, there may be mentioned a fairly low curing temperature of 105° C. requiring a relatively long curing time such as 3 to 8 minutes, and on the other hand, a fairly high temperature such as 200° C., under which conditions curing usually takes place in from 3 to 5 seconds. The temperature required to effect a cure and the time required at any given temperature is partly determined by the nature of the acid catalyst; the stronger the acid catalyst, the lower the temperature and/or the shorter the time required. The temperatures used for attaining the cure may be achieved by the use of such devices as convection ovens, heated rolls, infra-red lamps, super-heated steam or induction heaters.

After drying and curing of the film, a water-repellant coating may be applied immediately, or, and this is one of the significant advantages of the invention as mentioned above, the film may be wound on rolls and stored for subsequent coating. The types of coating which may be employed are the usual film-forming materials used for the purpose of controlling the moisture transmission rate and/or imparting heat-sealability to the film, for example, nitrocellulose, cellulose esters such as the acetate, alkyl celluloses such as methyl or ethyl cellulose, deacetylated chitin, rubber, chlorinated rubber, rubber hydrochloride, alkyl methacrylates such as butyl methacrylate, waxes such as montan wax, bees wax and carnauba wax, polyolefins such as polyethylene and polypropylene and vinylidene chloride containing polymers such as the vinylidene chloride-vinyl chloride copolymers sold under the trade-mark "Saran."

The following examples will serve to illustrate the invention in greater detail:

Example I

A combined anchorage and plasticizing solution is prepared in the following manner:

| | Parts by weight |
|---|---|
| Glycerol | 7.5 |
| Reactant S C (a polyoxyethylene formal) | 2.0 |
| Aluminum chloride hexahydrate: pH=3.0–3.2 | 0.5 |
| Soft water | 90.0 |
| | 100.0 |

A strip of wet swollen non-fibrous regenerated cellulose is immersed in this bath for 60 seconds, removed and dried 4 minutes at 105° C., then for 2 minutes at 140° C. on a drying frame. A uniform coating of a nitrocellulose lacquer is then applied. Strips of this film and of unanchored nitrocellulose coated film were immersed in water for 24 hours. At this time, the films were sponged dry and examined. The coating on the unanchored film was readily removed by rubbing or by cellulose adhesive tape. The coating on the anchored film could not be removed.

Example II

The following treatment bath was prepared:

| | Parts by weight |
|---|---|
| Sorbitol | 8.0 |
| Reactant X–1540 (aminotriazine modified acetal condensation product) | 1.0 |
| $ZnCl_2$/diglycolic acid ¼ pH=3.8 | 1.0 |
| Soft water | 90.0 |
| | 100.0 |

A strip of wet swollen non-fibrous regenerated cellulose was immersed in the above treatment bath for 60 seconds. Excess material was removed from the film and the film was dried for 4 minutes at 105° C., then 2 minutes at 140° C. on a drying frame. A uniform coating of a nitrocellulose lacquer was then applied. On immersion in water for 24 hours, the coating remained intact while the coating on a blank (unanchored film) was easily removed.

Example III

The following combined anchorage and softening bath was prepared.

| | Parts by weight |
|---|---|
| Propylene glycol | 7.0 |
| Reactant X–1694 (aminotriazine modified acetal condensation product) | 0.25 |
| Lactic acid, pH=3.6 | 1.0 |
| Soft water | 91.75 |
| | 100.00 |

A strip of swollen non-fibrous regenerated cellulose film was immersed in the above treatment bath for 45 seconds. Excess material was removed from the film and the film was dried for 3 minutes at 105° C., then 5 seconds at 200° C. on a drying frame. A uniform film of a "Saran" coating was then applied and dried. On immersion in water for 24 hours, the coating remained intact while the coating on a blank (unanchored film) was easily removed.

Example IV

The following composition was used in the combined plasticizing and anchorage bath during a plant trial.

| | Parts by weight |
|---|---|
| Polyhydric alcohols (70/30 glycol/glycerol) | 7.0 |
| Reactant X–140 | 2.9 |
| Aluminum chloride hexahydrate | 0.5 |
| Diglycolic acid | 0.1 |
| Soft water | 89.5 |
| | 100.0 |

A continuous web of swollen non-fibrous regenerated cellulose was passed through the bath resulting in an immersion time of about 12 seconds, excess material was removed with squeeze rolls, and the web continued through a conventional heated air and roll dryer receiving an average dry of 1½ minutes at 85–90° C. The rolls of film so produced were then immediately coated with a nitrocellulose based lacquer which was then given a dry of 6 seconds at 100° C. After immersion of the film in water for 24 hours, the coating remained intact while the coating on a blank (unanchored film) was easily removed.

What I claim as my invention is:

1. A process for treating non-fibrous regenerated cellulose film which comprises:
    (a) applying to the film in the swollen state, as an anchorage agent, an aqueous medium containing a polyacetal, said polyacetal comprising the condensation product of a polyol and an aldehyde,
    (b) drying and curing the so treated film, and
    (c) subsequently applying a water repellant topcoat over said anchorage agent.
2. A process as claimed in claim 1 wherein the polyacetal is a polyformal.
3. A process as claimed in claim 1 wherein the polyol is a polyalkylene glycol.
4. A process according to claim 1 wherein the topcoat is selected from the group consisting of nitrocellulose, cellulose acetate, alkyl cellulose, deacetylated chitin, rubber, chlorinated rubber, rubber hydrochloride, alkyl methacrylate, wax, polyolefin and a vinylidene chloride-containing polymer.
5. A process according to claim 4 wherein the topcoat comprises nitrocellulose.
6. A process according to claim 4 wherein the topcoat comprises a vinylidene chloride-containing polymer.
7. A process as claimed in claim 1, wherein, in step (a) the swollen regenerated cellulose film is passed through the aqueous medium containing the polyacetal, said medium also containing a cellulose-placticizing agent.
8. A process as claimed in claim 1, wherein, between steps (a) and (b), the swollen regenerated cellulose film is then passed through a bath containing a cellulose-plasticizing agent.
9. A process as claimed in claim 8, wherein swollen regenerated cellulose film, after step (a) but before plasticization, is then washed to remove excess resin.
10. A process as claimed in claim 1, wherein in step (a) the swollen regenerated cellulose film is sprayed with the aqueous medium containing the polyacetal, is then partially dried and then subjected to treatment with a solution of a cellulose-plasticizing agent before application of steps (b) and (c).
11. A process for treating a non-fibrous regenerated cellulose film which comprises the steps of
    (a) passing said film in a swollen state through an aqueous bath containing, as anchorage agent, a polyacetal comprising the condensation product of a polyol and an aldehyde, said bath also containing an acid curing catalyst and a cellulose plasticizing agent
    (b) drying and curing the film and
    (c) applying thereto a water repellent topcoat over said anchorage agent.
12. A process according to claim 11 wherein the topcoat is selected from the group consisting of nitrocellulose, cellulose acetate, alkyl cellulose, deacetylated chitin, rubber, chlorinated rubber, rubber hydrochloride, alkyl methacrylate, wax, polyolefin and a vinylidene chloride-containing polymer.
13. A process according to claim 12 wherein the topcoat comprises nitrocellulose.
14. A process according to claim 12 wherein the topcoat comprises a vinylidene chloride-containing polymer.
15. A process as claimed in claim 11 wherein the aqueous bath contains a water-soluble polyhydric alcohol as the cellulose-plasticizing agent.
16. An anchored non-fibrous regenerated cellulose film having on at least one surface thereof, as anchorage agent, a polyacetal comprising the condensation product of a polyol and an aldehyde, said anchored film being in a cured state and carrying a water-repellent topcoat over said anchorage agent.
17. A film as claimed in claim 16 wherein the polyacetal is a polyalkylene glycol-formaldehyde condensation product.
18. A film as claimed in claim 17, wherein the polyacetal is a diethylene glycol-formaldehyde condensation product.
19. A film claimed in claim 16 wherein the water repellant topcoat is selected from the group consisting of: nitrocellulose, cellulose acetate, an alkyl cellulose, deacetylated chitin, rubber, chlorinated rubber, rubber hydrochloride, an alkyl methacrylate, a wax, a polyolefin and a vinylidine chloride-containing polymer.
20. A film as claimed in claim 19 wherein the water repellent topcoat comprises nitrocellulose.
21. A film as claimed in claim 19 wherein the water repellent topcoat comprises a vinylidene chloride-containing polymer.

References Cited by the Examiner

UNITED STATES PATENTS

| 2,417,014 | 3/1947 | Pollard | 117—145 X |
| 2,432,542 | 12/1947 | Pitzl | 117—145 X |
| 2,546,575 | 3/1951 | Wooding | 117—76 |
| 2,639,241 | 5/1953 | Cornwell | 117—145 X |
| 2,785,995 | 3/1957 | Kress | 117—118 |
| 2,895,923 | 7/1959 | Kress | 260—67.6 X |
| 2,987,418 | 6/1961 | Wooding | 117—161 |

WILLIAM D. MARTIN, *Primary Examiner.*

RICHARD D. NEVIUS, *Examiner.*

A. NAVARO, T. G. DAVIS, *Assistant Examiners.*